March 9, 1965 H. K. MONEYPENNY ETAL 3,173,015
ELECTRONIC OUTLINE FOLLOWER AND REJECT SYSTEM
Filed March 20, 1962 12 Sheets-Sheet 1

INVENTORS.
HAROLD KENNETH MONEYPENNY
RONALD KITCHENER
BY KURT KELMAN
AGENT

March 9, 1965 H. K. MONEYPENNY ETAL 3,173,015
ELECTRONIC OUTLINE FOLLOWER AND REJECT SYSTEM
Filed March 20, 1962 12 Sheets-Sheet 4

INVENTORS.
HAROLD KENNETH MONEYPENNY
RONALD KITCHENER
By Kurt Kelman
AGENT

March 9, 1965 H. K. MONEYPENNY ETAL 3,173,015
ELECTRONIC OUTLINE FOLLOWER AND REJECT SYSTEM
Filed March 20, 1962 12 Sheets-Sheet 10

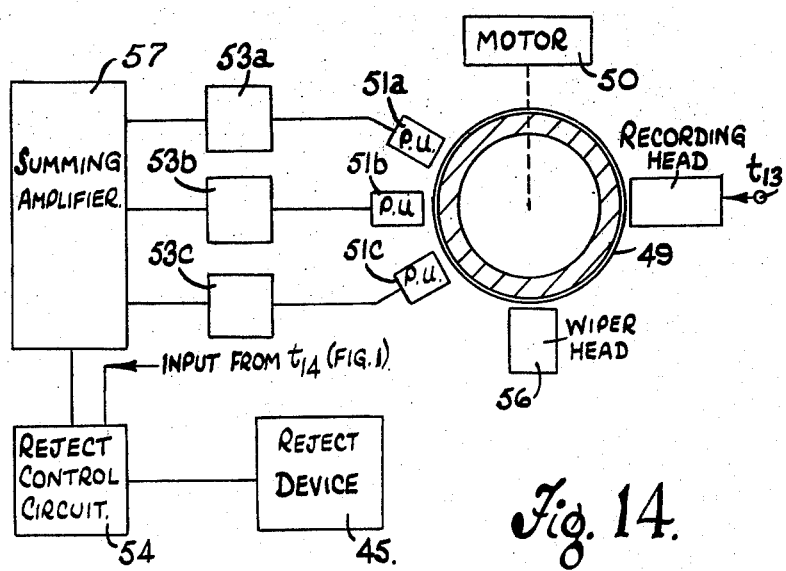

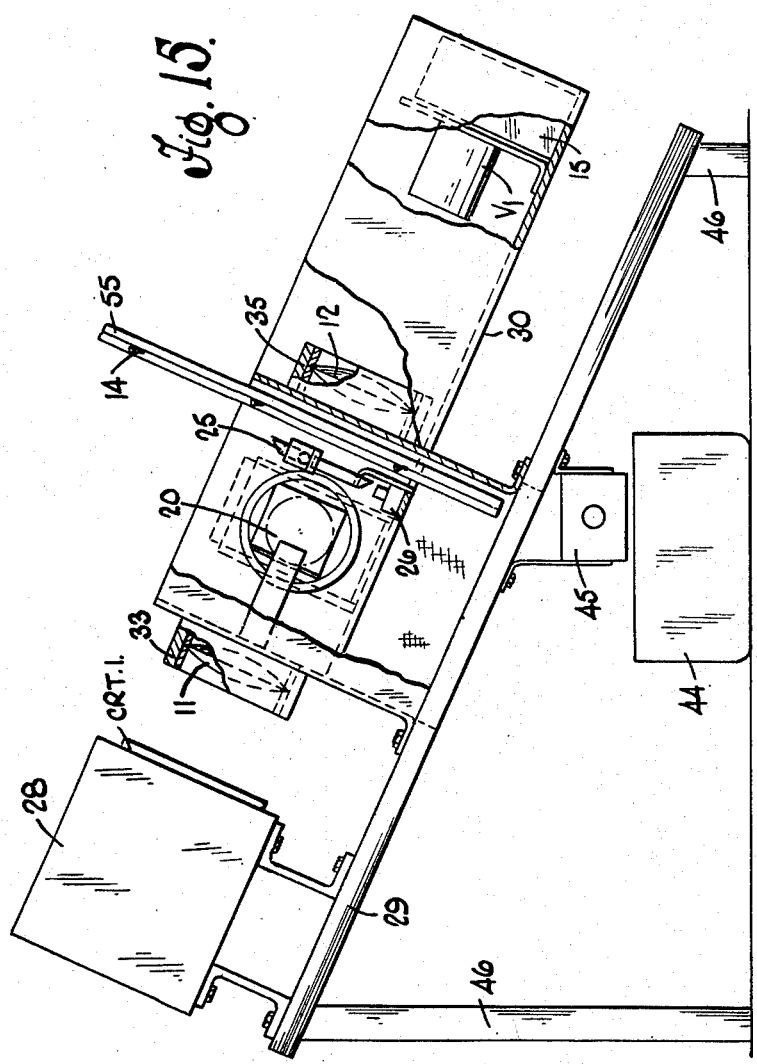

United States Patent Office 3,173,015
Patented Mar. 9, 1965

3,173,015
ELECTRONIC OUTLINE FOLLOWER AND
REJECT SYSTEM
Harold Kenneth Moneypenny, Wolverhampton, and
Ronald Kitchener, Penn, Wolverhampton, England,
assignors to G.K.N. Group Services Limited, Smethwick, Stafford, England, a British company
Filed Mar. 20, 1962, Ser. No. 181,092
11 Claims. (Cl. 250—217)

This invention relates to a method of and apparatus for tracing an optically discernible boundary. By such a boundary is meant a boundary which is seen to exist by the naked eye, or with the aid of optical apparatus making use of a light ray which is eclipsed, absorbed, reflected or otherwise modulated differently on opposite sides of the boundary. The expression "modulated" used herein and as applied to a light ray is to be deemed to include any of the forms of modulation specifically mentioned, namely, eclipsing, absorbtion or reflection.

The boundary to be traced may be constituted by the profile of an article or of a quantity of material usually in the form of a solid, but possibly in the form of a liquid or gas.

The boundary may be constituted however by the junction of two parts of an article, one of which parts modulates a light ray differently from the other.

The need to trace a boundary, that is to arrive at a qualitative or quantitative determination of the configuration of the boundary, arises in various fields including the manufacture of articles and testing applicable to the improvement or control of manufacture. One of these fields in which the invention has been principally developed is that of inspecting articles to determine whether they conform dimensionally to a predetermined specification.

Heretofore this has been done in many cases by visual comparison of an article with a sample conforming to the specified dimensions. In one form of inspection of this character images of the profiles of the article to be inspected and the sample are projected in magnified form on a screen, but the degree of reliability achieved as to the rejection of articles not conforming to the specification varies considerably from one inspector to another, and there is also fatigue induced by a prolonged work-period on the part of the inspector.

One of the objects of the present invention is to provide a method of and apparatus for tracing a boundary which will be capable of reducing or possibly eliminating entirely the subjective and hence variable factor which is inevitably present in inspection systems of the visual type hereinbefore referred to.

A further object of the invention is to effect tracing of a boundary by application of an electrical tracing signal to a cathode ray oscilloscope to cause the light spot afforded thereby to travel along a path conforming to the boundary to be traced.

A further object of the invention is to derive an electrical tracing signal representative of the boundary undergoing tracing.

Yet another object of the invention is to enable conformity or disconformity of the boundary being traced with a predetermined standard or form of boundary to be determined notwithstanding that the boundary being traced may be subjected to displacement as a whole whilst the tracing operation is performed.

A further object of the invention is to enable articles presenting boundaries for tracing and fed to a boundary tracing apparatus in succession to be passed or rejected automatically according to whether their boundaries, or at least a part of each such boundary, is in conformity or disconformity with a boundary of predetermined form.

Yet another object of the invention is to enable a representation of the boundary of a boundary being traced to be displayed stationarily notwithstanding that the boundary being traced may be adjusted to displacement as a whole.

According to the invention there is provided apparatus for tracing a boundary comprising a cathode ray tube having a screen and means for forming an electron beam incident thereon to form a light spot, first beam deflecting means for deflecting said beam in one direction and second beam deflecting means for deflecting said beam in a direction transverse to said one direction, optical means for forming an image of said spot at a point on the boundary to be traced, light sensitive means responsive to the area of said spot image disposed at any instant one side of said boundary to furnish an electrical error signal of a magnitude dependent upon said area, means for generating a derived electrical signal in which said error signal appears as a time integral, means for converting said derived signal into tracing signal components of a form so co-related to said directions of deflection of said first and second deflection means as to produce spot displacement along a path curving in one direction or in the opposite direction according to whether said spot area is greater or less than a predetermined value, and means for feeding said tracing signal components respectively to said first and second beam deflecting means to produce movement of said spot image along said boundary in substantially continuously overlapped relation therewith.

Preferably, said means for generating a derived electrical signal in which said error signal appears as a time integral comprises circuit means for generating a cyclic function and including means for phase-shifting said function by a term representing said time integral of said error signal.

Yet another object of the invention is to enable the boundaries of a succession of articles fed through a field of view afforded by the apparatus to be traced automatically. Accordingly a further feature of the invention is that the apparatus preferably includes means for generating a search signal separate from the tracing signal components and fed to said beam deflecting means to move said spot, and hence said spot image, along a search path in a passageway affording the field of view, and means responsive to the incidence of said spot image on said boundary of each of said articles to prevent transfer of such spot image back to the search path when said article boundary separates from said search path.

Embodiments of apparatus in accordance with the invention for performing the method thereof will now be described by way of example with reference to the accompanying drawings wherein.

Figure 11:
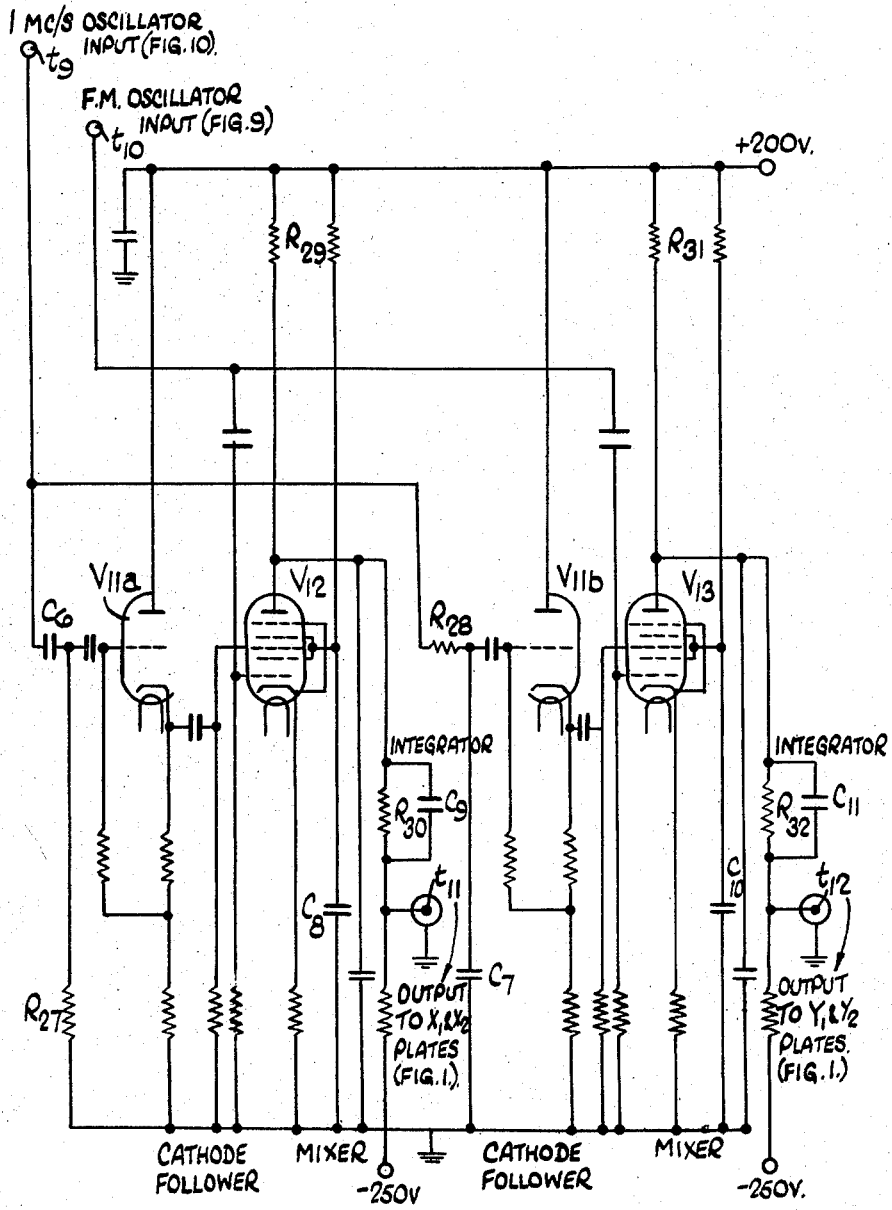
Figure 12:
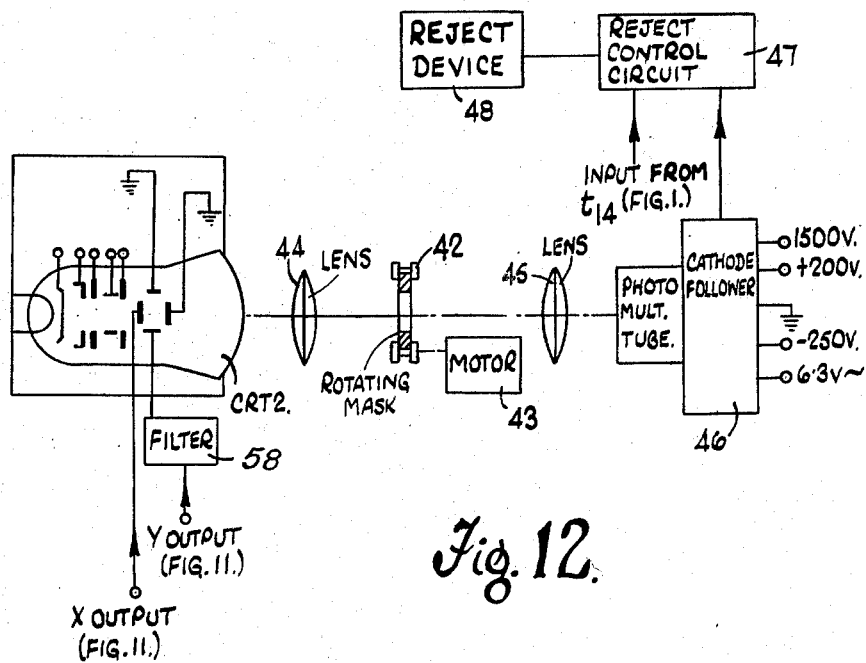

FIGURE 11 is a circuit diagram of one suitable form of mixer and integrator circuit fed with incoming carriers which are respectively of fixed frequency and varying frequency and furnishing components of tracing voltage suitable for application to the X and Y plates of the tracing cathode ray tube, FIGURE 12 illustrates diagrammatically one form of apparatus for displaying the tracing signal on a monitor or display cathode ray tube, comparing the boundary displayed by this tube with a standard boundary or mask to derive the reject or marking signal.

Figure 13:
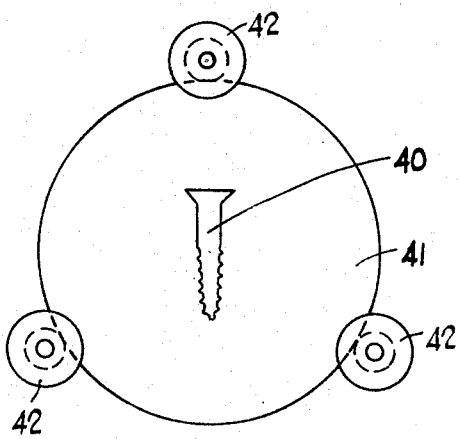

FIGURE 13 illustrates diagrammatically one form of mask and means for rotating same as incorporated in the apparatus of FIGURE 12.

Figure 1:
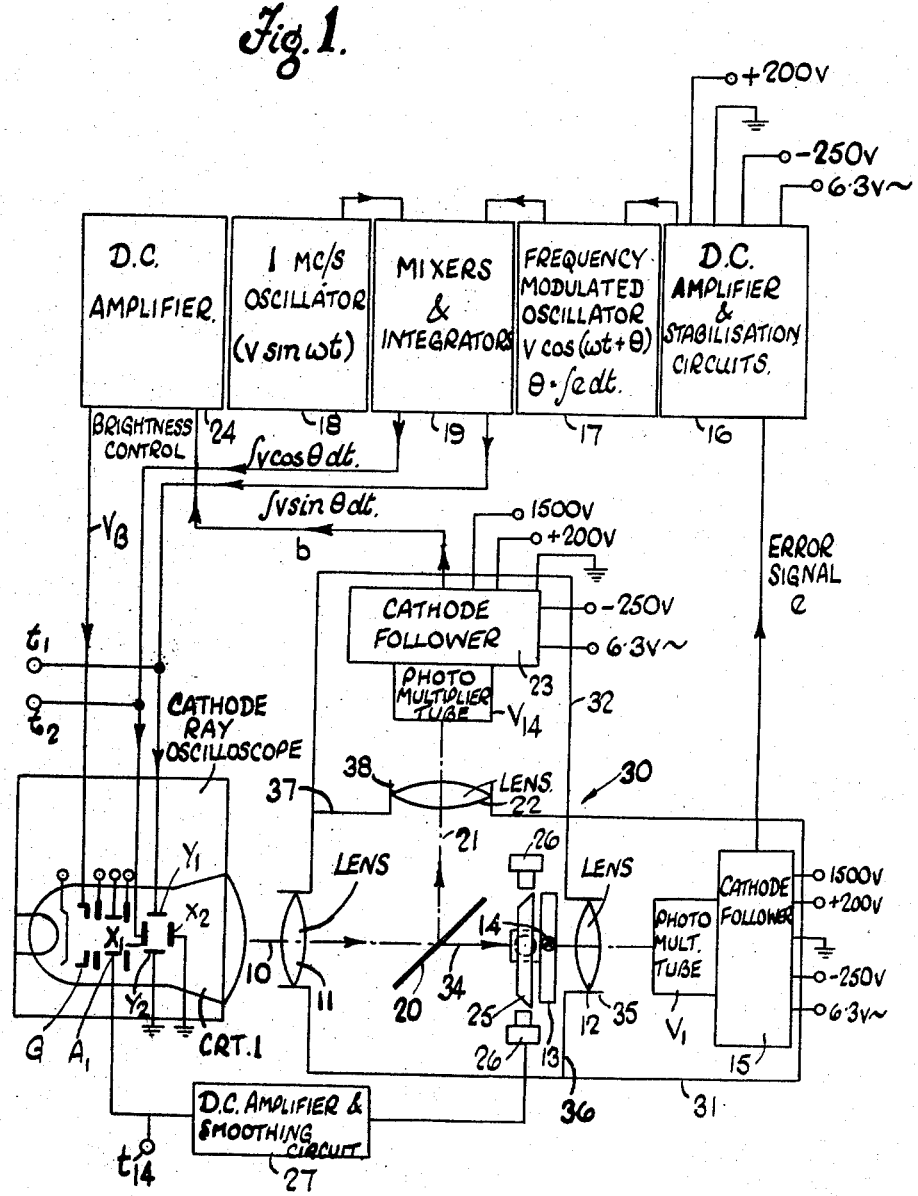
FIGURE 1 is a schematic diagram of one form of the apparatus.
Figure 2:
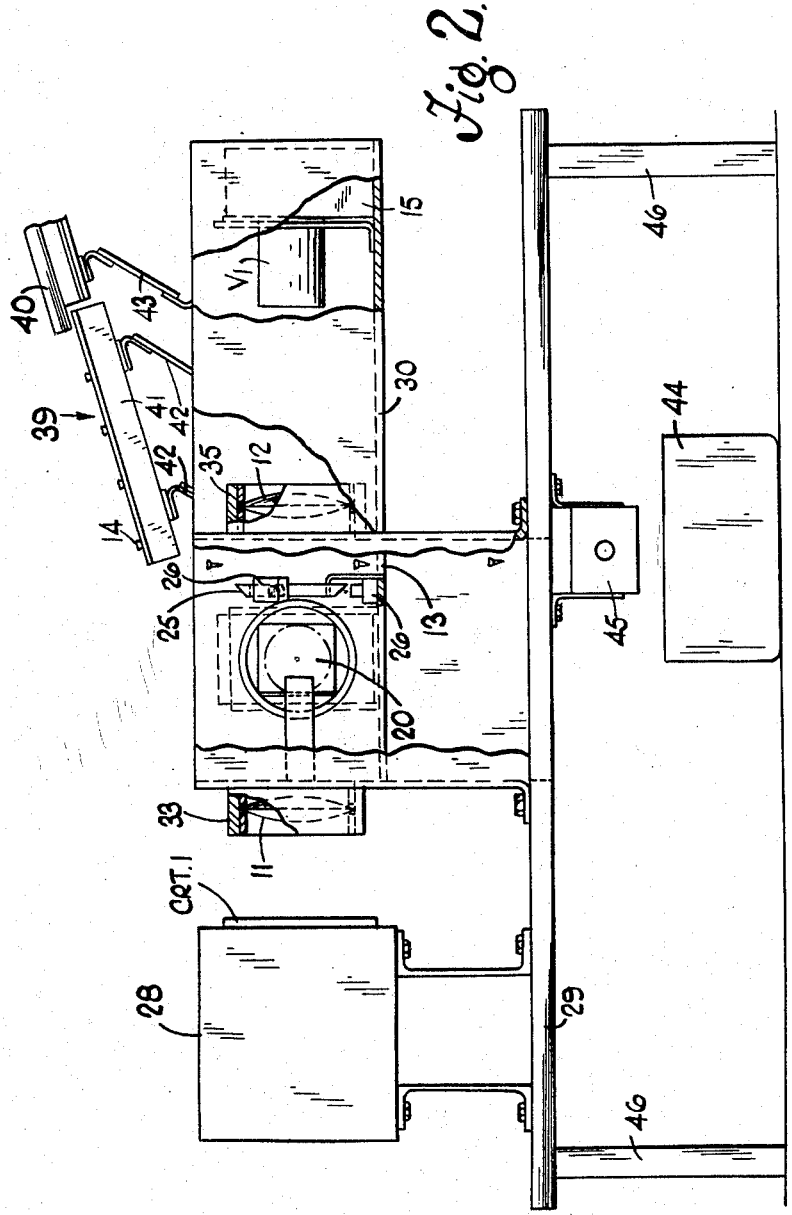
FIGURE 2 is a view in side elevation of a constructional embodiment of the apparatus.

FIGURE 14 illustrates an alternative form of apparatus for examination of the tracing signal furnished by the apparatus of FIGURE 1, wherein the tracing signal is recorded and parts thereof, corresponding to spaced positions on the boundary, are combined with each other to produce a reject or marking signal, and FIGURE 15 is a fragmentary view illustrating a modification of the apparatus illustrated in FIGURES 1 and 2 wherein the articles are guided during passage through the field of view so that their orientation is controlled.

Reference will firstly be made to FIGURE 1 to identify the main parts of the apparatus and briefly explain the overall manner of operation and the functions performed by the various parts, following which the various parts will be described in more detail.

The apparatus illustrated in FIGURE 1 is for tracing the boundary of an article and furnishes an electrical tracing signal which can be utilised for various purposes. Thus it is contemplated that the tracing signal may be used to ascertain whether the profile of an article conforms to a standard profile, either in its entirety or in respect of certain features of the profile only as may be desired in any particular case. The tracing signal may be utilised to operate a reject device for diverting the article fed into a reject feed path, as distinct from a normal feed path, along which articles conforming to the required standard, in respect of their profiles, are allowed or caused to pass. Alternatively, the tracing signal may be used to operate marking means for applying identifiable marking to standard or non-standard articles.

Whilst the invention as hereinafter described, is applied to apparatus designed to reject non-standard articles by deflection thereof or by marking it will be understood that the invention is not limited in scope to this particular use of the tracing signal derived by tracing a boundary. Such tracing signal could, for example, be employed during the manufacture of an article to control the operation of the machine employed for forming or shaping the article, so that in this case the apparatus would operate as a form of contactless gauging apparatus.

Further, it is contemplated that the tracing signal produced by the apparatus might be employed to record dimensional changes taking place in an article as a result of influences, such as heat, stress, or other working or environmental conditions, to which the article is subjected.

Further the apparatus could be used for recognising characters printed or otherwise marked on a sheet or member and for developing a recognition signal for feeding to a computor means or for other use.

In FIGURE 1 wherein is shown parts of an apparatus for generating a tracing signal, the apparatus comprises the following main parts:

(a) A tracing cathode ray tube CRT1, on the screen or frontal face of which is developed a light spot producing a light ray 10.

(b) Lens assemblies 11, 12 for focusing an image of the light spot in the plane of a slot or passageway 13, through which articles 14 are passed in succession and for focusing a further image of the light spot partially eclipsed by an article on the light sensitive element of a light sensitive means furnishing an electrical signal.

(c) A photo-multiplier tube V1 forming the aforesaid light sensitive means and associated cathode follower 15 furnishing an error signal $e$.

(d) A D.C. amplifier 16 for amplifying the error signal and incorporating a stabilisation circuit to avoid instability in the servo-loop afforded by the apparatus.

(e) A frequency modulated oscillator 17, the carrier signal of which is modulated to provide an output, of which the frequency deviation is proportional to the error signal $e$.

(f) A mixer and integrator 19 receiving a fixed frequency input from the circuit 18 and a varying frequency input from the circuit 17 and generating tracing signal components suitable for application to the X and Y plates X1, X2, Y1, Y2 of CRT1.

(g) A partly transparent reflector or mirror 20 for reflecting a part 21 of the light ray 10 through a lens assembly 22 to focus an image of the light spot on a light sensitive means.

(h) A photo-multiplier tube V14 forming the light sensitive means and associated cathode follower 23 for developing a brightness control signal $b$.

(i) A D.C. amplifier 24 for amplifying the signal $b$ and supplying a control voltage $V_B$ to the brightness control grid G of CRT1 to stabilise the brightness of the light spot produced thereby.

(j) A means for enlarging or defocusing the light spot when incident at its initial or search position in the field of view, comprising an annular reflector 25, an assembly of angularly spaced photo-multiplier tubes and cathode followers 26 and a D.C. amplifier and smoothing circuit 27 for feeding a defocusing voltage to anode A1 of CRT1.

(k) In general terms any departure of the light spot image in the plane of the passageway 13 from semi-eclipsed relation with the article produces an error signal $e$ which, after an integration with respect to time, splitting into components of sine and cosine form, each subjected to a further time integration, constitute components of tracing voltage suitable for application to the plates Y1, Y2 and X1, X2 to restore or steer the light spot image in the plane of the passageway 13 back to semi-eclipsed relation with the boundary of the article constituted in the embodiment illustrated by its profile.

(l) The components of tracing voltage are afforded at terminals $t1$ and $t2$ for further use as hereinafter described.

Referring now in more detail, firstly to the tracing cathode ray tube CRT1, the structure supporting the lens assemblies 11, 12 and 22, the photo-multiplier tube and cathode follower units 15, 23, 26, reflectors 20 and 25 and affording the passageway 13, reference is made to both FIGURES 1 and 2, in the latter of which certain of these parts are illustrated constructionally.

The tracing cathode ray tube CRT1 may form part of a conventional cathode ray oscilloscope 28, the tube itself incorporating the usual electrodes for forming an electron beam impinging on the front face or screen which is coated with material resulting in projection of a light spot. Certain of these electrodes, namely G and A1, have hereinbefore been referred to but it will be understood that they may be of generally conventional form and will not be further described. The cathode ray oscilloscope 28 may incorporate the usual power supply and amplifier circuits, for amplifying, in a linear manner, voltages applied to terminals designated X1, X2 and Y1 and Y2 whereby corresponding amplified voltages are applied to the X1, X2 plates and the Y1, Y2 plates.

The oscilloscope 28 may be supported on a base 29 which also serves to support a housing 30 incorporating two branches 31 and 32 extending at right angles to each other as viewed in plan, so that the housing generally is of L-shaped form. In the part of the housing common to the two branches 31 and 32 is formed an inlet aperture surrounded by a cylindrical or other suitable support 33 for the lens assembly 11, which latter, although shown for simplicity as a single lens may constitute a plurality of lenses for forming a sharply defined image of the cathode ray tube spot in the median plane of the passageway 13, through which the articles are caused to pass.

Between the passageway 13 and the lens assembly 11 is disposed the reflecting element 20 which may be constituted by a sheet of glass. Part of the ray of light 10 from the spot is transmitted through the glass, as indicated at 34 whilst part is reflected as indicated at 21.

The part 34 of the light ray 10 is partly eclipsed by the article 14 when the latter moves into the field of view which conveniently is defined by the inner boundary of an annular reflector 25 of frusto-conical form.

The further lens assembly 12 which again is shown for simplicity as a single lens element but which in practice may be a plurality of lenses, is carried by a cylindrical supporting member 35 and focuses an image of the partly eclipsed light spot on the cathode of photo-multiplier tube V1. The photo-multiplier tube and cathode follower assemblies are carried by the branches 31 and 32 of the housing 30 at the ends of these branches and the branches include partitions 36 and 37 in which the lens assembly supports 35 and 38 are mounted, and which exclude from those parts of the branches 31 and 32 in which the respective photo-multiplier tubes are accommodated, light other than that constituted by the ray 34 in the first case and by the ray 21 in the second case.

The apparatus is designed for tracing the profile of any articles of a suitable size for passage gravitational through the passageway 13 and is shown specifically as applied to the boundary tracing of wood screws which form the articles 14.

Such screws may be delivered to the entrance aperture or slot at the upper end of the passageway 13 by any suitable feeding means, such as that indicated generally at 39, comprising a pair of guide rails defining a slot into which the shanks of the screws can depend whilst their heads are supported by the upwardly presented edge faces of the guide rails to which the screws are delivered by a trough member 40 of V-shape in cross-section.

The trough member 40 may be subjected to longitudinal vibration by vibrator means (not shown) and such motion may also be imparted to the guide rails 41 if desired, for this purpose all these parts being supported upon inclined spring arms 42 for the guide rails and 43 for the V-shaped trough.

Below the base plate 29 may be disposed containers, of which one is seen at 44, arranged side by side, one of them being disposed in vertical alignment in the lateral direction with the path of descent of the screws 14 and the other being offset laterally to receive screws diverted into a descending reject path, by means of a reject device 45. This may comprise a nozzle controlled by a solenoid operated valve connected to a source of pneumatic supply so that when the valve is open an air jet delivered laterally onto the descending screws diverts that found to be non-standard, as a result of generation of a tracing signal. If marking is required the device 45 may be a paint spray also solenoid operated.

The base plate 29 is thus raised by a supporting structure 46 which may be in the form of enclosed walls apertured to permit of introduction and removal of the containers such as 44 and serving also to support the reject device 45.

The housing 30 also serves to support the photo-multiplier tube and cathode follower units 26 which provide for enlargement or defocusing of the spot as hereinafter described.

Referring now to the form of the tracing voltage components required to be applied to the deflector means of the tracing cathode ray tube CRT1, it will be understood that commercially available cathode ray tubes are normally equipped with deflector means such as plates for deflecting the electron beam electrostatically in directions at right angles to each other and suitable components of tracing voltage require, therefore, to be derived from the error signal for application to the deflector means to steer the spot constantly in partially eclipsed relation to the boundary of the screw undergoing tracing. Conveniently, although not essentially, the spot is arranged to be semi-eclipsed.

The voltages required to be applied to the deflector means cause a light spot S to be steered along a boundary which partially eclipses it must be such that at any given instant the spot tends to move along a path the radius of curvature of which changes according to the degree of eclipsing.

Total eclipse must thus produce the tightest turn in one sense, e.g. to the left, and total exposure must produce the tightest turn in the other sense, e.g. to the right, whilst a predetermined degree of eclipse, e.g. semi-eclipse must produce rectilinear movement.

Figure 3:
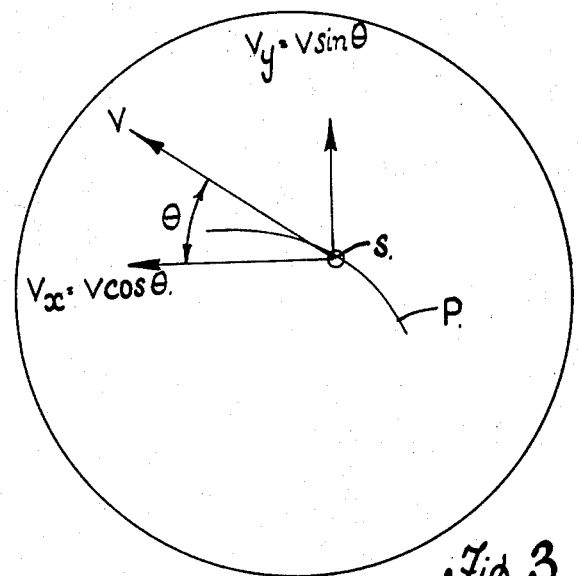
FIGURE 3 is a diagrammatic view of the frontal face of the cathode ray tube which forms the tracing tube of FIGURE 1 showing a light spot travelling along a predetermined path P and the components of velocity resulting from such movement.
Figure 4:
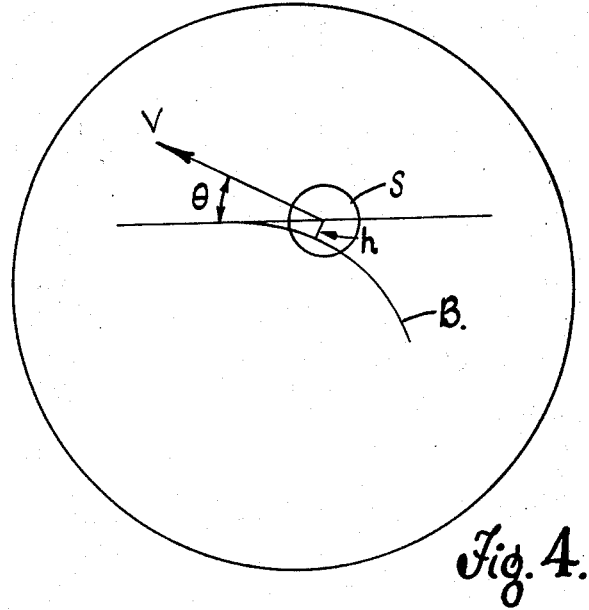
FIGURE 4 is a view similar to FIGURE 3 also illustrating a light spot travelling adjacent to a predetermined boundary B at a height or outward displacement $h$ relatively thereto.

The form of the tracing voltage components required to produce these conditions will be understood from the following explanation wherein reference to FIGURES 3 and 4 is made.

Referring to FIGURE 3, if the light spot is made to travel with a constant velocity V along a path P, then by resolving the vector along the X and Y axes the velocities in these directions are $V_x = V \cos \theta$ and $V_y = V \sin \theta$ respectively where $\theta$ is the angle the boundary makes with the X-axis at any instant.

Since $$V_x = \frac{dx}{dt}$$
$$x = \int V_x \cdot dt$$
$$= V \int \cos \theta \cdot dt$$

and $$V_y = \frac{dy}{dt}$$
$$y = \int V_y \cdot dt$$
$$= V \int \sin \theta \cdot dt$$

Therefore to make the spot travel at a constant velocity V at an angle $\theta$ to the axis, the voltages required are those necessary to produce displacements $x$, $y$ and are therefore proportional to $V \int \cos \theta dt$ and $V \int \sin \theta dt$.

Referring to FIGURE 4 it is supposed that the light spot is displaced a distance $h$ from its semi-eclipsed position then the output of the photo-multiplier will be proportional to $h$ say equal to $e$ which is positive when exposure of the spot exceeds the semi-eclipsed exposure and which is negative when the exposure of the spot is less than the semi-eclipsed exposure.

The curvature of the boundary is $$\frac{d\theta}{ds}$$

where $s$ is displacement along the boundary and since $$V = \frac{ds}{dt}$$

then:
The curvature $$\frac{d\theta}{ds} = \frac{d\theta}{dt}\cdot\frac{dt}{ds} = \frac{d\theta}{dt}\cdot\frac{1}{V}$$

If we make the output of the photocell $$e = \frac{1}{k}\cdot\frac{d\theta}{dt}\cdot\frac{1}{V}$$

where $k$ is a constant, then $$\theta = kV\int e.dt$$

If the voltage $e$ is used to shift the frequency of an oscillator in a proportional manner the output of the oscillator will be $$\cos(wt + \int edt)$$
$$= \cos(wt + \theta)$$

Where $wt$ is the angular frequency of the unmodulated oscillator. Multiplying this by a carrier having components $\cos wt$, $\sin wt$ we can produce components $\cos \theta$, $\sin \theta$, with higher frequencies which can be removed. Integrating these components $\cos \theta$, $\sin \theta$ with respect to time will provide the necessary voltages to control the spot in the manner referred to in FIGURE 3.

Figure 7:
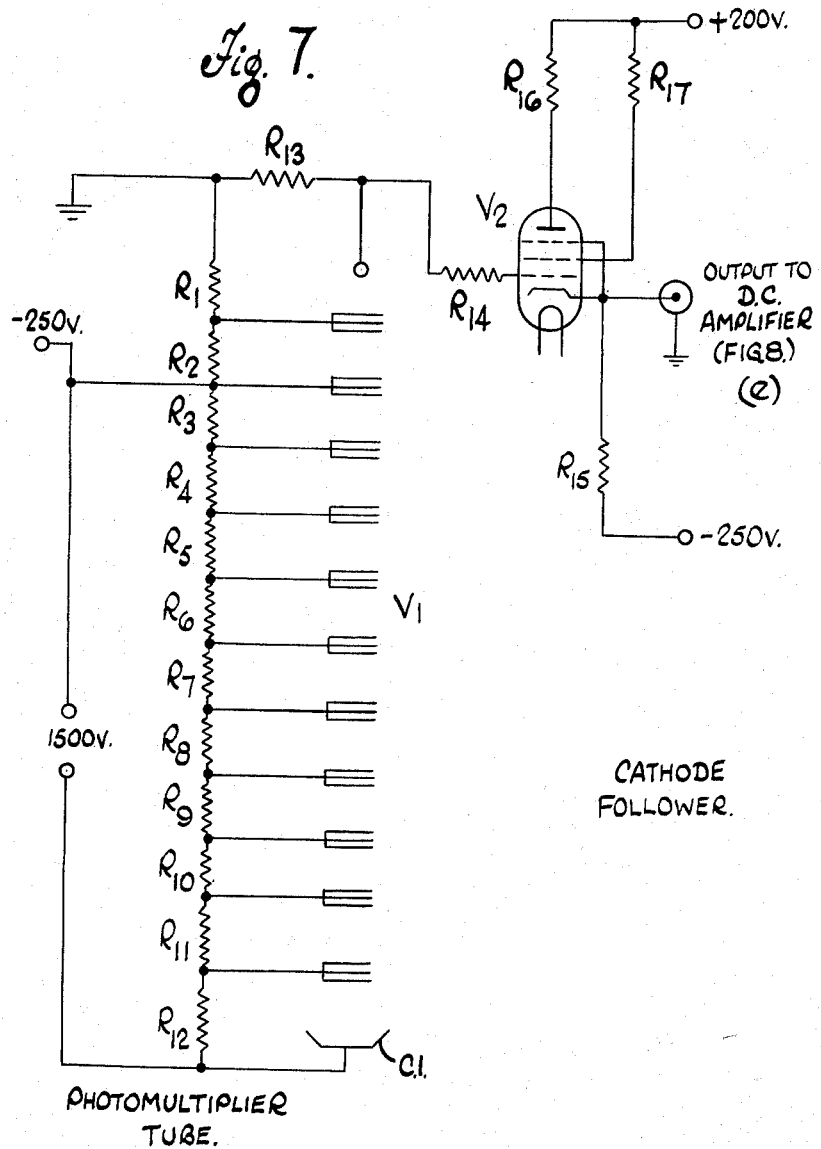
FIGURE 7 is a circuit diagram of one form a photo-multiplier tube and associated cathode follower suitable for use in generating the error signal and suitable for use in stabilising the brightness of the light spot of the tracing cathode ray tube.

Referring now to FIGURE 7, the photo-multiplier tube V1 is of any suitable known type having a photo-sensitive cathode c1 at which the eclipsed spot is focused and a plurality of anodes connected to points on a resistor chain R1 to R12 and furnishing an output through R13 and R14 to the grid of a cathode follower V2, developing its output across resistor R15 to terminal t3. This output, namely the error signal $e$, is proportional approximately to the lateral displacement of the spot from the semi-eclipsed position.

Figure 8:
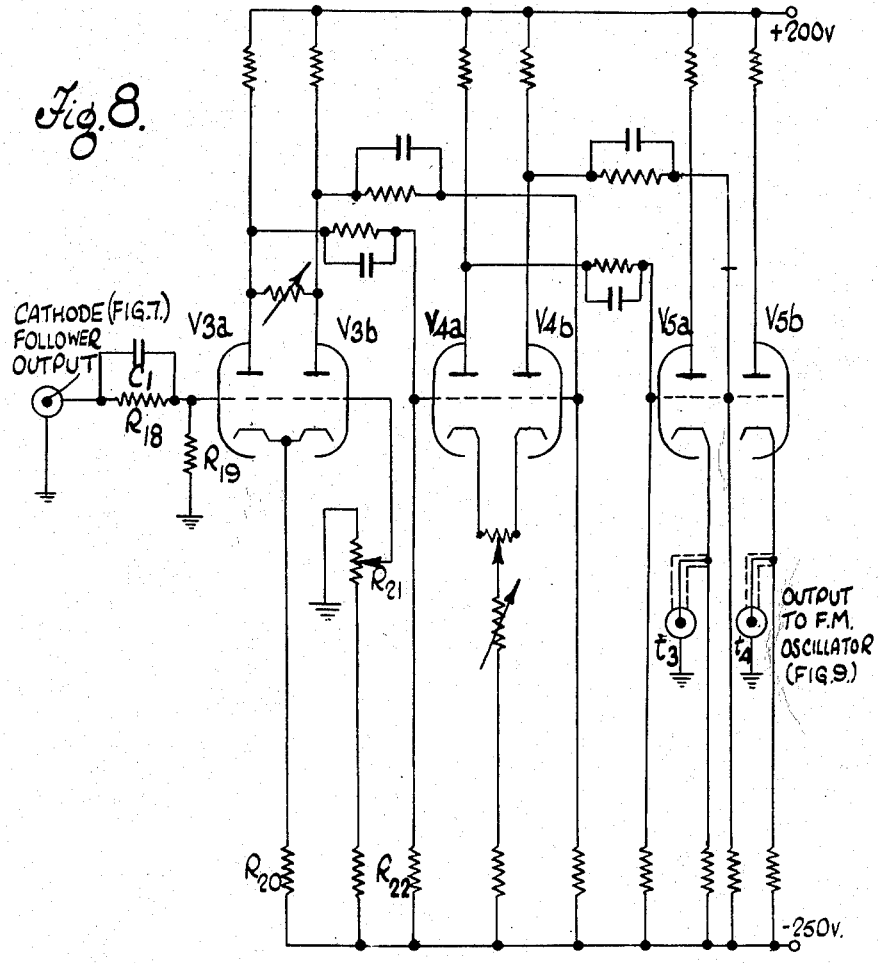
FIGURE 8 is a circuit diagram of one suitable form of D.C. amplifier and stabilisation circuit for amplifying the signal and supplying an output to a frequency modulated oscillator.

The output from terminal t3, the circuit of FIGURE 7, is fed to a D.C. amplifier as seen in FIGURE 8. This amplifier includes a phase shifting stabilising network comprising resistor R18 and capacitor C1, the resultant output being developed across resistor R19 and applied to the control grid of one half V3a of a phase splitter valve, the other half of which has its control grid connected to a variable resistor R21, in series with R22. The voltage appearing between the junction of R21 and R22 is an anti-phase to that appearing across resistor R19 by virtue of the voltage drop in the cathode load R20.

The phase shifter network C1, R18 is introduced conveniently at this stage in the servo-loop afforded by the cathode ray tube CRT1 and units 15, 16, 17, 18 and 19 since this loop inherently affords two integrations of the error signal and hence a 180 degree phase shift and is critically stable.

In practice additional phase shift does occur, for example, in the unit 16 and this would cause the system to oscillate but for the compensating phase shift introduced by the network C1, R18 which restores the system to a stable condition. The phase shifter circuit C1, R18 is a lead network. Stabilisation of servo-loops operating under the condition applicable in the present case is well understood and reference may be had to the Electronic Designers Handbook by Landee Davis and Albrecht, published by McGraw-Hill Book Company, New York and London, section 19-7c, pages 19 to 55 for a further explanation thereof.

The output from the phase splitter circuit is amplified by a balanced amplifier comprising the two valves V4a and V4b delivering outputs to respective cathode followers V5a and V5b and thence to output terminals t3 and t4.

Figure 9:
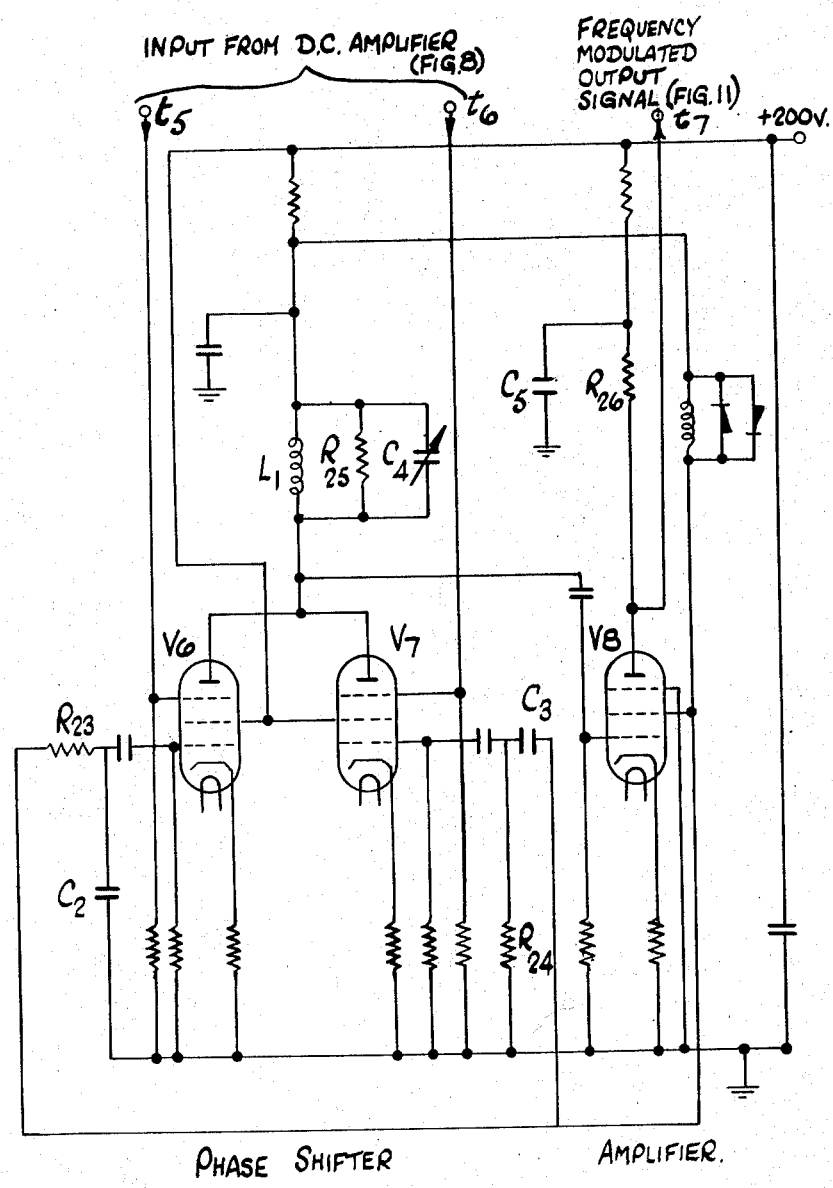
FIGURE 9 is a circuit diagram of one suitable form of frequency modulated oscillator, the modulating signal for which is developed in the circuit of FIGURE 8 from the error signal.

Referring to FIGURE 9 the variable phase-shift frequency modulated oscillator illustrated therein is of the general type known per se. The manner of operation of such oscillator and the conditions for establishing the generation of oscillations are described in the Proceedings of the I.R.E., Vol. 37, dated November 1949 in a paper entitled "Variable Phase-Shift Frequency Modulated Oscillator" by O. E. de Lang.

In general terms the output from an amplifier stage associated with the valve V8 having a broad frequency pass band is fed back through phase shifting networks R23, C2 and C3, R24 to the control grids of respective phase-shifts valve V6 and V7, the suppressor grids of which are maintained at equal voltages in the absence of any output from the D.C amplifier (unit 16). Under these conditions oscillation will take place at a predetermined carrier frequency $\omega$.

When an eror signal is applied to the input terminals t5 and t6 from the D.C. amplifier unit 16 the contribution to the current in the common anode load L1, R25, C4 of the valves V6 and V7 is no longer made up equally of anode currents from these two valves, and the circuit will now oscillate at a shifted frequency such as to develop a greater grid cathode voltage in whichever of the two valves V6 and V7 has undergone reduction in anode current in consequence of application of the modulated signal.

The output from the amplifier valve developed across an anode load comprising resistor R26 appears at terminal t7. The modulated carrier has the form $$V \cos (\omega + \theta)$$

where $\theta$ is $\int edt$.

Figure 10:
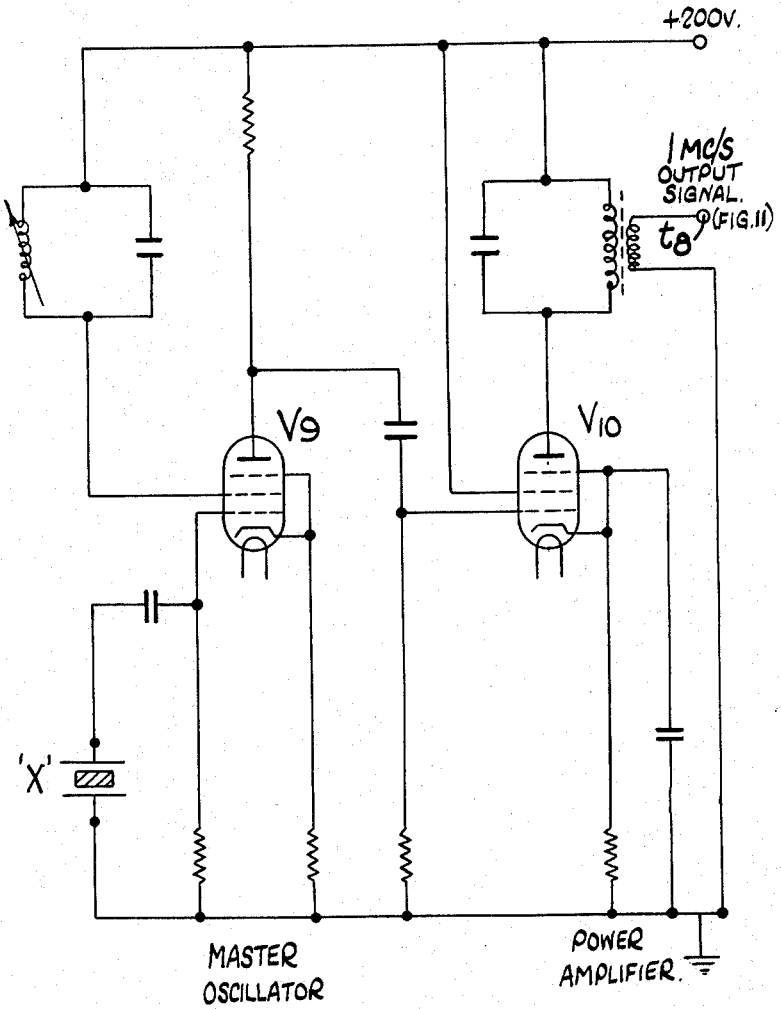
FIGURE 10 is a circuit diagram of one suitable form of fixed frequency oscillator.

The unit 18 shown in FIGURE 10 is a conventional fixed frequency oscillator stage oscillating at a fixed frequency $\omega$ controlled by means of a crystal X and coupled to a power amplifier stage providing an output of the form $V \sin \omega t$ at terminal t8.

The choice of the carrier frequency $\omega$ for both the fixed frequency oscillator and the frequency modulated oscillator is flexible but should preferably be sufficiently high relatively to other frequency components which it is required to develop in the servo-loop to enable the carrier frequency to be filtered out or attenuated without difficulty. In practice a carrier frequency of the order of 1 mc./s. is found suitable.

The outputs from the fixed frequency and the frequency modulated oscillators are mixed in the unit 19, the circuit of which is shown in FIGURE 11.

Also this circuit separates the resultant tracing signal generated into two components suitable for application to the X1, X2 plates and Y1, Y2 plates of the tracing tube CRT1.

For this purpose the circuit includes two pentagrid mixer valves V12 and V13 for the output to the X1, X2 plates and Y1, Y2 plates respectively.

The fixed frequency and frequency modulated signals are applied to the inner grid and control grids respectively of the two valves V12 and V13, in the case of the fixed frequency signal, this being passed through phase-shifting networks C6, R27 and R28, C7 to provide the required phase-shift between the voltages developed in the anode circuits of the mixer valves V12 and V13. The fixed frequency signal is applied to the inner grids of the pentagrid mixers through the intermediary of cathode follower valve V11a and V11b.

The resulting output to terminals t11 and t12 from the mixers V12 and V13 respectively comprise voltages of the form $\int V \cos \theta dt$, $\int V \sin \theta dt$.

The general design and manner of operation of the circuit of FIGURE 11 is known per se and is described in Electronic Designers Handbook by R. W. Landee, D. C. Davis and A. P. Albrecht, section 7-5, published by McGraw-Hill Book Company, London and New York.

In comparison with circuits therein disclosed the anode loads provided in the anode circuits of the mixer valves V12 and V13 comprise integrator circuits R29, C8, R30, C9 for the valve V12, and R31, C10, R32, C11 for the valve V13. These circuits also reject the unwanted higher frequency components.

In order to avoid variations in light intensity incident at the photo-multiplier tube V1 of the unit 15 which would produce false error signals $e$ as a result of random fluctuation of the intensity of light at different places on the screen of the tracing tube CRT1 for given electron beam velocities, and similar variations, a stabilising circuit is provided comprising the units 23 and 24.

Light is incident on the photo-multiplier tube V14 after partial reflection by the element and is subsequently subjected to amplification in the unit 24 to provide a control voltage $V_B$ on the grid G of CRT1. The circuit of the D.C. amplifier unit 24 may be similar to that of the unit 16 omitting the phase-shifter stabilisation circuit. It will, of course, be understood that the sense of the control voltage $V_B$ is such as to reduce the brightness whenever this tends to be increased by local variations in the light emitting coating of the screen on the tube CRT1.

To ensure that the light ray 34 will "lock" onto the boundary of an article such as a screw entering the field of view, means are provided comprising the photocell cathode follower assemblies 26, reflector 25, and unit 27 for enlarging or de-focusing the light spot during the initial or search period preparatory to entry of a screw into the field of view.

The light spot, under these conditions, tends to travel round the inner boundary of the annular reflector 25 which is of frusto-conical form and has its reflecting face presented towards the tube CRT1.

The eclipsed half of the light spot reflects light which is received by the units 26 which may conveniently be three in number disposed at equal angular intervals around the axis of the branch 31 of the housing 30.

These units will thus develop signals of pulse form which are fed to the amplifier 27, and this may contain smoothing circuits providing for only gradual decline or decay at the trailing edge of each pulse before the next pulse is received.

Figure 5:
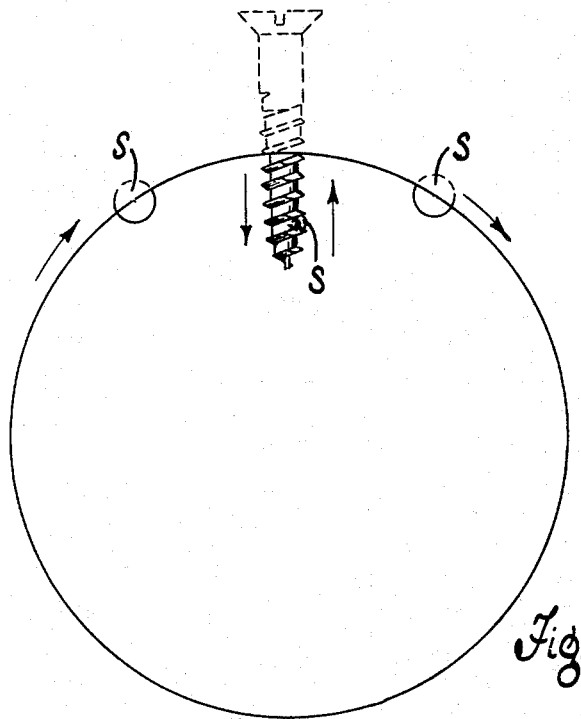
FIGURE 5 is an enlarged frontal view of the tracing cathode ray tube incorporated in FIGURE 1 illustrating the path of movement of the spot at the time an article is entering the field of view.

FIGURE 5 illustrates the conditions which are obtained when a screw enters the field of view. The light spot S of de-focused or enlarged form travelling around the perimeter of the field of view becomes focused or contracted as soon as it is incident on the profile of the screw, and is displaced inwardly of the perimeter of the field of view, thereafter reverting to its de-focused or enlarged form when again incident at the perimeter of the field of view on the opposite side of the screw.

Figure 6:
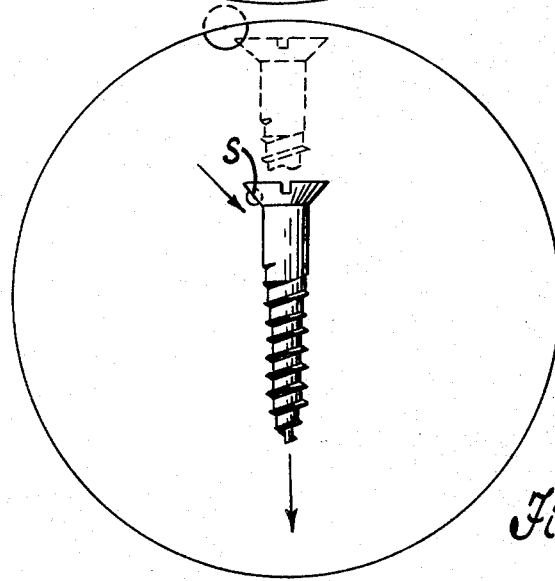
FIGURE 6 is a view similar to FIGURE 5 illustrating the conditions which exist when the article "breaks contact" with the perimeter of the field view and the conditions thereafter existing when the article is travelling through the field of view.

Without de-focusing of the spot there would be the possibility of the light spot locking onto the perimeter of the field of view rather than onto the screw when the upper or trailing end of the latter "breaks contact" or affords a gap with respect to the upper part of the perimeter of the field of view, as seen particularly in broken lines in FIGURE 6.

When the spot S is enlarged or de-focused it is of sufficient dimensions to bridge the gap between the upper or trailing end of the screw and the upper part of the perimeter and will consequently tend to travel along the nearest part of the boundary of the screw in preference to along the gap or zone between the upper boundary of the screw and the upper part of the perimeter.

It will be understood that the components of the tracing signal available at terminals $t1$ and $t2$ may be employed in various ways. For example, it may merely be required for some purpose to display or reconstitute the boundary as a stationary image instead of as a moving image as will be the case on the face of the tube CRT1.

In this case the components of the tracing voltage are passed through means for filtering or attenuating the frequencies representing translatory movement.

For example, in FIGURE 12 there is shown a display or monitor cathode ray tube CRT2 in which the output to the Y plates is passed through a filter 58 rejecting frequency components corresponding to the transit time of the screws through the field of view, whilst the output fed to the X plates from terminals $t2$ is identical with that applied to the X plates of CRT 1. The elimination of frequency components corresponding to the transit time of the screws ensures that the displayed or reconstituted boundary appearing on the screen of the tube CRT2 will not move in a translatory manner in the vertical direction as does the original boundary presented by a screw falling through the field of view. Since the screw has only a component translation in the vertical direction, it is unnecessary to insert any filter, such as the filter 58, in the connection from terminal $t2$ of the circuit shown in FIGURE 1, although such filter could be inserted were there any possibility of horizontal drift or movement of the screw in passing through the field of view.

The apparatus shown in FIGURE 12 includes further means for comparing the displayed or reconstituted boundary appearing on the screen of the tube CRT2 with a standard boundary.

The standard boundary may be formed as an aperture 40 in a mask element 41 supported for rotation about an axis 42 coincident with the centre of gravity of the profile afforded by the boundary and at right angles to the face of the tube CRT2.

For this purpose the mask element 40 may be supported on rollers 42 grooved to overlap with the peripheral margin of the mask element and locating this in position axially, one at least of these rollers being driven by a motor 43 at a speed less than that corresponding to travel of the spot around the boundary of the screw but greater than that at which random angular deflection or rotation of the screws in the plane of the profile may take place as they pass through the passageway 13 of the apparatus of FIGURE 1.

Lens assemblies 44 and 45 focus an image of the displayed boundary in the plane of the mask element 41 and then on the photo-sensitive cathode of a photo-amplifier tube and cathode follower unit 46.

It will be understood that the speed of movement of the light spot around the boundary of the article is preferably high compared with the speed of passage of the screws or articles through the passageway 13 and with any rotation or angular displacement of the screws or articles. Consequently at some instant during passage of each screw or article through the field of view there should be coincidence between the boundary displayed on the tube CRT2 and that afforded by the aperture of the mask element 41 assuming that the screw or article in question conforms to the "standard" defined by the mask element 41.

Under these conditions a signal will be generated by the unit 46. The signal generated by the unit 46 is used to control operation of a reject device 48 through the intermediary of a reject control circuit. The reject device 48 may be a device for deflecting the screws by an air jet or may be a marking appliance such as a paint spray for marking articles not conforming to the required standard.

The reject control circuit would include a time-measuring or gate circuit placed in an active condition by a counting pulse (correlated with the passage of a screw or article through the field of view). For example such pulse might be obtained from the output of unit 27 at terminal $t14$, namely the voltage supplied thereby for establishing contraction or focusing of the spot upon passage of the screw or article into the field of view.

The time-measuring or gate circuit would provide an output pulse at the end of its period of activity to operate the reject device in relation to the screw or article initiating the active condition unless such output pulse were cancelled by a secondary signal from unit 46. For example the signal from unit 46 may be applied to charge a capacitor in the reject control device positively, whereas the output from the time-measuring or gating circuit would charge such capacitor negatively. Thus, a resultant signal would be furnished from the reject control circuit 47 to operate the reject device 48 only if the secondary signal were not developed.

In an alternative form of apparatus shown in FIGURE 14 each of the tracing signal components available at terminals $t1$ and $t2$ is recorded. For this purpose the signal available at terminal $t1$, for example, is applied to terminal $t13$ of a recording head associated with a magnetic recording drum having a cylinder or surface layer 49 capable of receiving and retaining the signal as a magnetic record.

This drum is driven by a motor 50 and arranged in angularly spaced relation to the recording head are a plurality of pick-up heads $51a$, $51b$, $51c$ which may be three or more in number as desired. The pick-up heads would be disposed at selected angularly spaced positions so as to receive signals corresponding to selected parts of the boundary of the screw or article which it is especially desired to examine or monitor. For example one such head may correspond to the point of the screw and the two others may correspond to the included angles between the underside of the head and the adjacent part of the shank.

The signals generated in the pick-up heads $51a$ to $51c$ are fed to a summing amplifier or circuit 52 through the intermediary of units $53a$, $53b$, $53c$ which amplify or attenuate the magnitudes of the signals in the desired ratio preparatory to summation.

The summing amplifier 57 generates a secondary signal which is fed to a reject control circuit 54 including a time-measuring or gating circuit as previously described with reference to unit 47. Thus a reject device 45 would be operated should a secondary signal from the summing amplifier fail to cancel the output pulse developed by the time measuring or gating circuit at the end of its period of activity. As previously mentioned the reject device would then cause the screw or article to be diverted along a reject path into a separate container, or to be marked.

In a modified form of apparatus illustrated in FIGURE 15 the arrangement of parts is similar to that shown in FIGURE 2. The main component parts of this apparatus are of the form already described with reference to FIGURES 1 and 3 to 13 except that in this case passage of the articles, again illustrated as screws 14, through the passageway 13 is accompanied by positional control so that each screw or article being otherwise than of standard form presents a constant profile to the field of view.

Thus the guide member 55 which may be of V or U section trough is formed of transparent material preferably glass so as to be non-scratching and the screws slide down this with their shanks resting on the base of the trough or channel and their heads engaged by the side walls.

Other parts of the apparatus shown in FIGURE 15 are indicated by reference numerals corresponding to those applied to similar parts in FIGURE 2.

It will be understood that boundary variations which may legitimately be presented by "standard" screws as for example by the slot in the head which may or may not be visible in profile according to the orientation of the screw about its own axis may be "ignored" by suppression or non-use of the corresponding part of the tracing signal when applied to control the operation of a reject device.

Alternatively the screws may be controlled in orientation by means provided to ensure that the slots are visible in profile either continuously or for at least during one instant whilst passing through the field of view. For example the screws may have a rotation imparted to them about their own axes during descent through the passageway 13 either by rollers at the delivery end of the inlet guide, or possibly by magnetic field structure setting up a rotating magnetic field in the passageway 13.

What we claim then is:

1. Apparatus for tracing a boundary comprising
   (a) a cathode ray tube having a screen and means for forming an electron beam incident thereon to form a light spot,
   (b) first beam deflecting means for deflecting said beam in one direction and second beam deflecting means for deflecting said beam in a direction transverse to said one direction,
   (c) optical means for forming an image of said spot at a point on the boundary to be traced,
   (d) light sensitive means responsive to the area of said spot image disposed at any instant on one side of said boundary to furnish an electrical error signal of a magnitude dependent upon said area,
   (e) means for generating a derived electrical signal in which said error signal appears as a time integral,
   (f) means for converting said derived signal into tracing signal components of a form so co-related to said directions of deflection of said first and second deflections means as to produce spot displacement along a path curving in one direction or in the opposite direction according to whether said spot area is greater or less than a predetermined value,
   (g) and means for feeding said tracing signal components respectively to said first and second beam deflecting means to produce movement of said spot image along said boundary in substantially continuously overlapped relation therewith.

2. Apparatus as claimed in claim 1 in which said means for generating a derived electrical signal in which said error signal appears as a time integral comprises circuit means for generating a cyclic function and including means for phase-shifting said function by a term representing said time integral of said error signal.

3. Apparatus as claimed in claim 1 in which
   (a) said first and second beam deflecting means deflect said beam in mutually perpendicular directions,
   (b) said means for generating said derived electrical signal comprises circuit means including a carrier frequency generator and including a circuit means for shifting the frequency of said generator to an extent dependent upon the magnitude of said error signal whereby the phase of the resultant derived signal represents said time integral of said error signal,
   (c) said means for converting said derived signal comprises circuit means for forming time integrals of sine and cosine functions of said phase shift.

4. Apparatus as claimed in claim 1 further comprising means for examining said tracing signal components to determine whether at least part of the boundary conforms to predetermined form.

5. Apparatus as claimed in claim 4 further comprising
   (a) structure defining a feed path for a succession of articles presenting the respective boundaries to be traced, said feed path extending between said optical means and said light sensitive means,
   (b) display means for displaying a reproduction of each of said boundaries,
   (c) and filter means connected operatively between said display means and said means for converting said derived signal into said tracing signals for filtering out components representing displacement of said boundaries as a whole in moving along said feed path.

6. Apparatus as claimed in claim 5 further comprising
   (a) pattern means presenting a standard boundary in a plane parallel to that reproduced by said display means and conforming to that which said articles are required to present,
   (b) means for effecting relative rotation between said pattern means and said display means in a plane parallel to those in which the displayed and pattern boundaries lie and at a speed less than that of orbital movement of said spot image around the boundary of each of said articles but greater than that of random rotation of said articles themselves in the planes in which their respective boundaries lie,
   (c) light sensitive means responsive to coincidence between said boundary presented by said display means and said boundary presented by said pattern means to furnish an electrical control signal.

7. Apparatus as claimed in claim 4 in which said means for examining said tracing signal components comprises
   (a) a record element for reception of respective successive parts of at least one of said tracing signal components,
   (b) means for impressing said successive parts on said record element,
   (c) means for simultaneously reproducing said successive parts,
   (d) means for combining said simultaneously reproduced parts to form a secondary signal which is independent of displacement of the boundary as a whole.

8. Apparatus for tracing a boundary comprising, a structure defining a passageway for passage therethrough of an article whereof the boundary is required to be traced, a light source including a cathode ray tube having means for forming an electron beam incident on a screen of the tube to produce a light spot, said tube having beam deflecting means, optical means for directing a light ray to form an image of said spot at a point on the boundary to be traced, light-sensitive means responsive to the area of said spot disposed at any instant on one side of said boundary to furnish an error signal, means fed with said error signal for generating a tracing signal for producing movement of said spot along a path having a curvature of a direction and of a severity determined by said error signal to maintain said spot image in substantially continuously overlapped relation with said boundary, and means for feeding said tracing signal to said deflecting means, means separate from said tracing signal for generating a search signal fed to said beam deflecting means to move said spot and hence said spot image along a search path in said passageway, and means responsive to the incidence of said spot image on said boundary to prevent transfer of said spot image back to said search path when said boundary of said article separates from said search path.

9. Apparatus according to claim 8 wherein said means for generating said search signal includes, an element having an aperture defining a field of view in said passageway, means for generating an electrical signal for controlling the size of said light spot and including a light sensitive means, and means for directing part of said light ray, when incident at the perimeter of said aperture, onto the light sensitive means of said spot size controlling means to enlarge said spot.

10. Apparatus for tracing the boundaries of a succession of articles comprising in combination means for feeding articles whereof the boundary is to be tested along a path through a viewing station, a cathode ray oscilloscope disposed at one side of said station and including beam deflection means for controlling movement of a light spot furnished by such oscilloscope, means for optically focusing an image of said light spot at said path, photocell means disposed at the opposite side of said station, means for optically focusing on said photocell means an image of said light spot partially eclipsed by said articles in passing along said feed path to provide an error signal from said photocell means in response to deviation of said light spot image from predetermined partially eclipsed relation with said boundary, circuit means for generating in response to reception of said error signal a tracing signal for producing movement of said spot image in substantially continuously partially eclipsed relation with said articles, said circuit means being operatively connected between said photocell means and said beam deflection means to complete a servo-loop system, said beam deflection means being fed exclusively with said tracing signal during said partial eclipse of said light spot image by said articles, and means for locking said light spot image onto the boundary of each article while such article passes through the viewing station.

11. Apparatus for tracing the boundaries of a succession of articles comprising in combination means for feeding articles whereof the boundary is to be tested along a path through a viewing station, a cathode ray oscilloscope disposed at one side of said station and including beam deflector elements for producing beam deflection in mutually perpendicular directions for controlling movement of a light spot afforded by said oscilloscope, photocell means disposed at the opposite side of said station, means for optically focusing on said photocell means an image of said light spot partially eclipsed by said articles in passing along said feed path to provide an error signal from said photocell means in response to deviation of said light spot image from predetermined partially eclipsed relation with said boundary, circuit means for generating in response to said error signal a tracing signal including components which are time integrals of sine and cosine functions of time integrals of said error signal respectively and connected between said photocell means and said beam deflector elements to feed said components respectively to the last said elements, and means for locking said light spot image onto the boundary of each article while such article passes through the viewing station.

References Cited by the Examiner

UNITED STATES PATENTS

| | | | |
|---|---|---|---|
| 2,415,191 | 2/47 | Rajchman | 250—217 X |
| 2,528,020 | 10/50 | Sunstein | 250—202 X |
| 2,625,265 | 1/53 | Cox. | |
| 2,791,697 | 5/57 | Dell | 250—217 |
| 2,838,683 | 6/58 | Munro | 250—202 X |
| 2,980,332 | 4/61 | Brouillette et al. | 250—201 X |
| 2,983,822 | 5/61 | Brouillette | 250—217 |
| 3,015,730 | 1/62 | Johnson | 250—202 |

FOREIGN PATENTS 817,910  6/37  France.

RALPH G. NILSON, *Primary Examiner.*

FRANK L. ABBOTT, *Examiner.*